US006081824A

United States Patent [19]
Julier et al.

[11] Patent Number: 6,081,824
[45] Date of Patent: Jun. 27, 2000

[54] METHOD AND APPARATUS FOR FAST UNSIGNED INTEGRAL DIVISION

[75] Inventors: Michael A. Julier, Phoenix, Ariz.; Oded Lempel, Haifa, Israel; Thomas M. Johnson, Tempe, Ariz.

[73] Assignee: Intel Corporation, Santa Clara, Calif.

[21] Appl. No.: 09/035,725

[22] Filed: Mar. 5, 1998

[51] Int. Cl.[7] .................................... G06F 7/50
[52] U.S. Cl. ............................................. 708/653
[58] Field of Search ................................ 708/653, 650

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,707,800 | 11/1987 | Montrone et al. | 364/788 |
| 4,771,379 | 9/1988 | Ando et al. | 364/200 |
| 4,989,168 | 1/1991 | Kuroda et al. | 364/715.09 |
| 4,989,173 | 1/1991 | Kaneda | 708/653 |
| 5,095,457 | 3/1992 | Jeong | 364/758 |
| 5,187,679 | 2/1993 | Vassiliadis et al. | 364/786 |
| 5,315,540 | 5/1994 | Lawless | 708/653 |
| 5,651,121 | 7/1997 | Davies | 395/376 |
| 5,696,713 | 12/1997 | Kovacs | 708/653 |
| 5,903,485 | 5/1999 | Bennett | 708/653 |

OTHER PUBLICATIONS

J. Shipnes, *Graphics Processing with the 88110 RISC Microprocessor*, IEEE (1992), pp. 169–174.

*MC88110 Second Generation RISC Microprocessor User's Manual*, Motorola Inc. (1991).

*Errata to MC88110 Second Generation RISC Microprocessor User's Manual*, Motorola Inc. (1992), pp. 1–11.

*MC88110 Programmer's Reference Guide*, Motorola Inc. (1992), p. 1–4.

*i860™ Microprocessor Family Programmer's Reference Manual*, Intel Corporation (1992), Ch. 1, 3, 8, 12.

R. B. Lee, *Accelerating Multimedia With Enhanced Microprocessors*, IEEE Micro (Apr. 1995), pp. 22–32.

*TMS320C2x User's Guide*, Texas Instruments (1993) pp 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video*, Microprocessor Report (Jan. 1994), pp. 16, 17.

SPARC Technology Business, *UltraSPARC Multimedia Capabilities On–Chip Support for Real–Time Video and Advanced Graphics*, Sun Microsystems (Sep. 1994).

Y. Kawakami et al., *LSI Applications: A Single–Chip Digital Processor for Voiceband Applications*, Solid State Circuits Conference, Digest of Technical Papers; IEEE International (1980).

B. Case, *Philips Hopes to Displace DSPs with VLIW.* Microprocessor Report (Dec. 94), pp. 12–15.

L. Gwennhap, *UltraSparc Adds Multimedia Instructions*, Microprocessor Report (Dec. 94), pp. 16–18.

N. Margulis, *i860 Microprocessor Architecture*, McGraw Hill, Inc. (1990) Ch. 6, 7, 8, 10, 11.

*Pentium Processor User's Manual, vol. 3: Architecture and Programming Manual*, Intel Corporation (1993), Ch. 1, 3, 4, 6, 8, and 18.

*Primary Examiner*—David H. Malzahn
*Attorney, Agent, or Firm*—Blakely, Sokoloff, Taylor & Zafman LLP

[57] ABSTRACT

A method and apparatus for fast unsigned integral division, utilized in compositing images, sounds or other data, is provided. Compositing utilizes a division step. The divisor is the value of two to the Nth power minus one. The division comprises the steps of making a copy of the first number, thus producing a third number. The first number is shifted to the right by N. The third number is biased, and is then added to the first number. The resultant number is shifted right by N. This process results in a division by $2^N-1$, with short latency instructions, instead of the long latency instructions usually used for division operations.

24 Claims, 6 Drawing Sheets

METHOD AND APPARATUS FOR FAST UNSIGNED INTEGRAL DIVISION

FIELD OF THE INVENTION

The present invention relates to arithmetic operations, and more specifically, to unsigned integral divisions.

BACKGROUND OF THE INVENTION

Many applications today utilize composited images or sounds. This is done, for example, to display a picture which includes two or more original images, or to transmit a sound which is an incorporation of two or more original sounds. Such compositing of image or sound requires a scaling of the original components.

Scaling often utilizes division by a number which is not a multiple of two. Generally, division by a multiple of two is simple in a binary system. Shifting the number to the right by the number to which two is raised to obtain the divisor provides the correct result. For example, to divide by 8, shift right by 3, since $2^3=8$.

However, division by numbers which are not multiples of two is more complex. One prior art method of dividing a remainder by divisor is a multistep process. The remainder has twice as many bits as the divisor. For example, if the remainder is a 64 bit number, the divisor is a 32 bit number.

First, the remainder register is shifted left by one bit. Next, the divisor register is subtracted from the left half of the remainder register, and the result is placed in the left half of the remainder register. Next, it is tested whether the remainder is less than zero or not. If the remainder is greater than or equal to zero, the remainder register is shifted to the left by one, setting the new rightmost bit to 1. If the remainder is less than zero, the divisor is added to the left half of the remainder register, and the remainder register is shifted to the left, setting the new rightmost bit to 0.

This process is repeated as many times as the size of the divisor. In one example, for a 32 bit divisor, the process is repeated 32 times. After the last repetition, the left half of the remainder is shifted right by 1 bit. This process produces an accurate result. However, as can be seen, for a divisor which is over three bits this process is time consuming.

Additionally, when a sixteen bit number is divided by an eight bit number, the result is a sixteen bit number. If the divisor is a large number, this results in an eight bit number with leading zeroes expanding it to a sixteen bit number. This requires extra space for storing the number, and more complicated processing.

BRIEF SUMMARY OF THE INVENTION

The present invention is a method for compositing data representing images, sounds, etc. Compositing requires a division of a first number by a second number, the second number being the value of two to the Nth power minus one. First, a copy is made of the numerator. The first number is shifted right by N. Then, the copy of the first number is biased. Next, the shifted first number, and the biased copy of the first number are added. The result is then shifted by N. This process results in a division by $2^N-1$, with short latency instructions, instead of the long latency instructions usually used for division operations.

In one embodiment, the numerator is an X bit data, while the denominator is an X/2 bit data, and result is an X/2 bit data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for implementing a fast unsigned integral division is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The purpose of this invention is to accelerate the computation of frequently used unsigned integral divisions utilized in compositing original data to create a resultant data. The divide instruction in many microprocessor implementations is a long latency instruction, making it expensive. The method disclosed in the present invention performs the divide operation using a sequence of simpler operations, speeding up the computation. Additionally, an original data of X bits is divided by an X/2 bit divisor results in an X/2 bit result, speeding up further calculations and reducing storage bits used.

For example, in compositing images utilizing 16-bit colors, intermediate values are scaled by 255, the largest possible value for an unsigned 8-bit data operand. Such scaling normally is usually accomplished using a divide operation. The present invention introduces an alternative sequence of operations to perform the division, generating the same result, and yielding better overall performance. In one embodiment the result is an 8-bit result.

Overview of the Computer System

Figure 1:
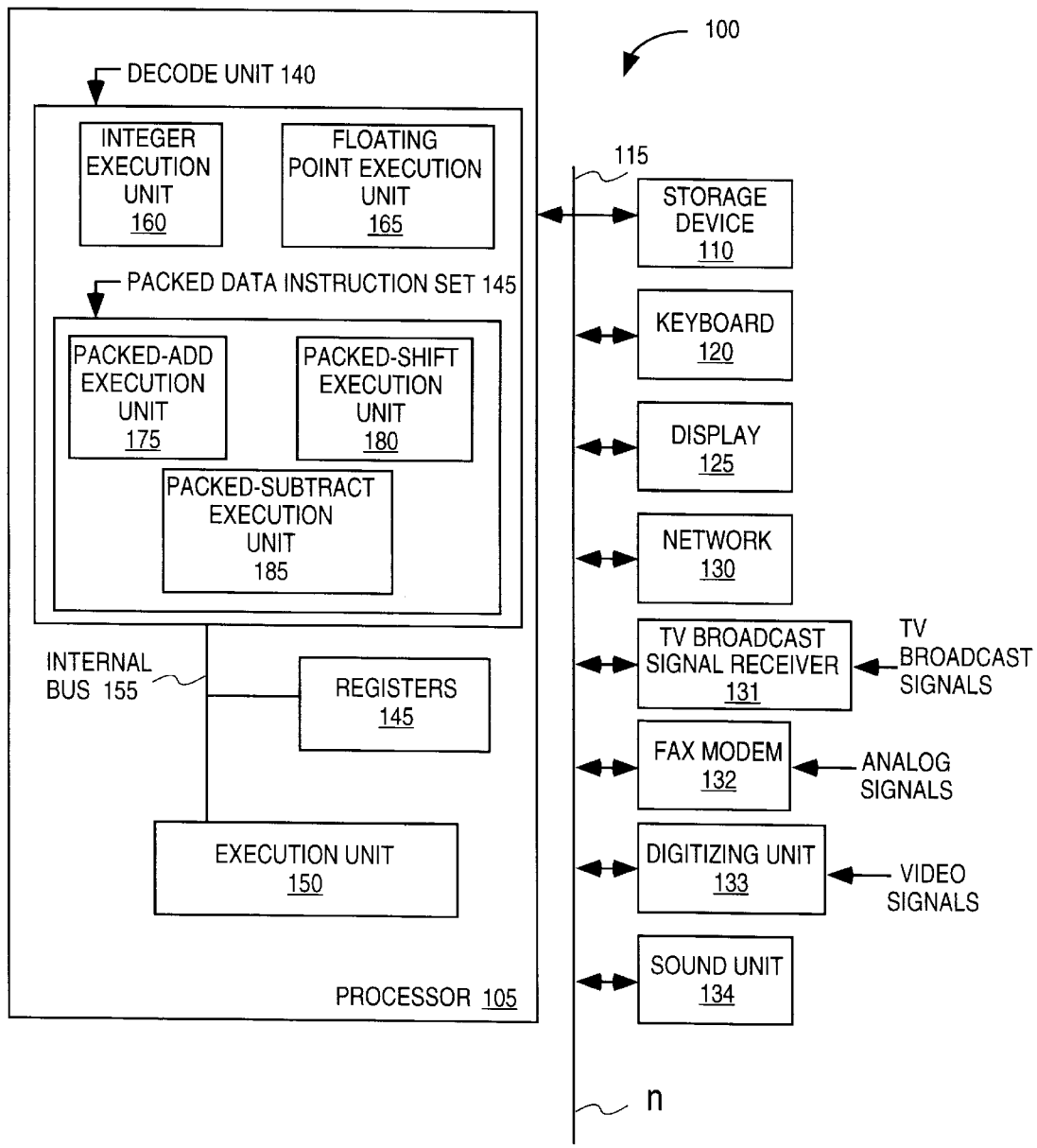
FIG. 1 is an illustration of an exemplary computer system in which the method of the present invention may be implemented.

FIG. 1 shows a block diagram illustrating an exemplary computer system 100 according to one embodiment of the invention. The exemplary computer system 100 includes a processor 105, a storage device 110, and a bus 115. The processor 105 is coupled to the storage device 110 by the bus 115. In addition, a number of user input/output devices, such as a keyboard 120 and a display device 125, are also coupled to the bus 115. The processor 105 represents a central processing unit of any type of architecture, such as a CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more busses (e.g., PCI, ISA, X-Bus, EISA, VESA, etc.) and bridges (also termed bus controllers). While this embodiment is described in relation to a single processor computer system, the invention could be implemented in a multi-processor computer system. In addition, while this embodiment is described in relation to a 64-bit computer system, the invention is not limited to a 64-bit computer system.

In addition to other devices, one or more of a television (TV) broadcast signal receiver 131, fax/modem 132, and a sound unit 134 may optionally be coupled to bus 115. The TV broadcast signal receiver 131 represents a device which receives and/or transmits one or more television signals. The fax/modem 132 represents a fax and/or modem for receiving and/or transmitting analog signals representing data. The sound unit 134 represents one or more devices for inputting and/or outputting sound (e.g., microphones, speakers, magnetic storage devices, optical storage devices, etc.).

FIG. 1 additionally illustrates that the processor 105 includes a decode unit 140, a set of registers 145, an execution unit 150, and an internal bus 155. The processor 105 may contain additional elements, which are known in the art, and not necessary to understanding the present invention. The decode unit 140, registers 145 and execution unit 150 are coupled together by internal bus 155. The decode unit 140 is used for decoding instructions received by processor 105 into control signals and/or microcode entry points. In response to these control signals and/or microcode entry points, the execution unit 150 performs the appropriate operations. The decode unit 140 may be implemented using any number of different mechanisms (e.g., a look-up table, hardware implementation, a PLA, etc.). The decoding of the various instructions may be represented by a series of if/then statements, however, it is understood that the execution of an instruction does not require a serial processing of if/then statements.

The decode unit 140 includes a plurality of execution units in one embodiment of the present invention. For example, the decode unit 140 may include an integer execution unit 160 for execution of integer instructions. In addition, decode unit 140 may include a floating point execution unit 165 for the execution of floating point instructions. The decode unit 140 of processor 105 may further include a packed data execution unit 170, which executes packed data instructions. The packed data execution unit 170 may include a plurality of execution circuits, for executing packed data instructions. These execution units may include, but are not limited to, a packed-add execution circuit 175, packed-shift execution circuit 180, and a packed-subtract execution circuit 185. Other packed data instruction execution units may be present, as the implementation requires. The packed data execution unit 170 may alternately be in the execution unit 150.

While these packed data instructions can be implemented to perform any number of different operations, in one embodiment these packed data instructions are those described in "A Set of Instructions for Operating on Packed Data," filed on Aug. 31, 1995, Ser. No. 08/521,360.

Furthermore, in one embodiment, the processor 105 is a pipelined processor (e.g., a Pentium processor) capable of completing one or more of these packed data instructions per clock cycle (ignoring any data dependencies and pipeline freezes). In addition to the packed data instructions, processor 105 can include new instructions and/or instructions similar to or the same as those found in existing general purpose processors. For example, in one embodiment the processor 105 supports an instruction set which is compatible with the Intel Architecture instruction set used by existing processors, such as the Pentium processor. Alternative embodiments of the invention may contain more or less, as well as different, packed data instructions and still utilize the teachings of this invention.

The registers 145 represent a storage area on processor 105 for storing information, including control/status information, integer data, floating point data, and packed data. It is understood that one aspect of the invention is the described instruction set for operating on packed data. According to this aspect of the invention, the storage area used for storing the packed data is not critical. The term data processing system is used herein to refer to any machine for processing data, including the computer system(s) described with reference to FIG. 1.

Packed Data Instructions

As described above, the computer system 100 includes a variety of packed data execution units. The instructions embodied in some of these execution units are described below.

Figure 2A:
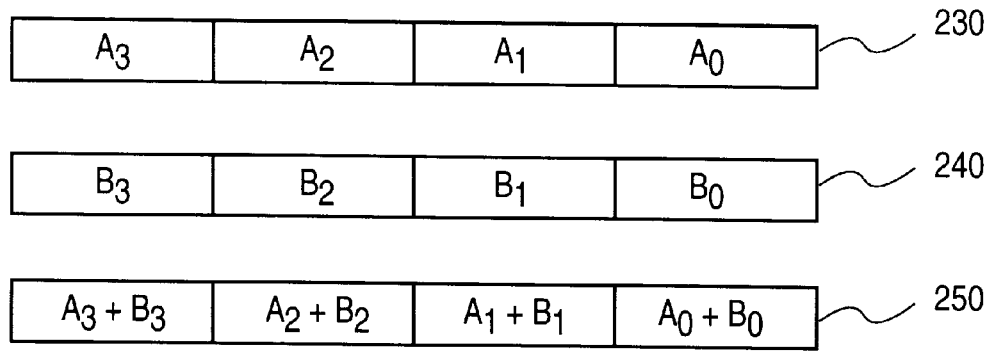
FIG. 2A is an illustration of a packed add instruction.

FIG. 2A illustrates the operation of the packed add instruction according to one embodiment of the invention. FIG. 2A illustrates a packed add word operation. The data elements of a first operand 230 are added to the respective packed data elements of a second operand 240 to generate a result 250. For example, data element 0 of the first operand 230 is added to data element 0 the second operand 240 and the result is stored as data element 0 of the result 250. The packed add operation may be performed using "saturation." If an operation is performed using saturation, the value of the data element 250 is clamped to a predetermined maximum or minimum value when the result of the operation exceeds the range of the data element 250. Exceeding the range of the data element 250 is referred to as data overflow or underflow. The use of saturation avoids the effects of data overflow or underflow. If the operation is performed without saturation, the data may be truncated or may indicate a data overflow or underflow in another manner.

The packed add instruction for unsigned integers acts in a similar manner to the packed add instruction, except that empty significant bits are zero, rather than one. The packed subtract instruction acts in a similar manner to the packed add instruction, except subtractions are performed.

Figure 2B:
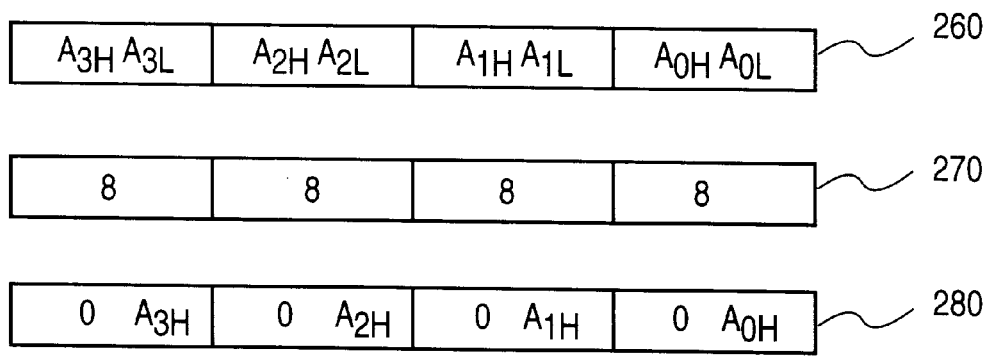
FIG. 2B is an illustration of a packed shift instruction.

FIG. 2B illustrates the operation of the packed shift instruction according to one embodiment of the invention. FIG. 2B illustrates a packed shift word operation. In one embodiment of the invention, a first operand 260 contains the data to be shifted, a second operand 270 contains the data representing the shift count. That is, first operand 260 will have each data element independently shifted by a shift count. In one embodiment, second operand 270 is packed data and contains the shift counts for each corresponding data element in first operand 260. In a second embodiment, the second operand 270 is not packed data, and each data element in the first operand 260 is shifted by the same shift count. A logical shift can operate by shifting bits right or left.

In a logical right shift the high order bits of each data element are filled with zeroes. A logical left shift causes the least significant bits of each data element to be filled with zeroes.

For any or all of the above instructions, alternative embodiments may vary the number of bits in the operand data elements, intermediate results, and resultant data elements. In addition, alternative embodiments may vary the number of data elements used, the number of intermediate results generated, and/or the number of data elements in the result.

The Method and Apparatus of the Present Invention

The present invention teaches a method and apparatus for compositing, or adding two or more data. An example of this is the combination of a background and foreground images to create a complete image. For example, a background may be a picture of a plant, and the foreground may be the picture of a colored glass, placed in front of the plant. In combining these two pictures, the color coefficients of both pictures are added. Another example is adding music from two different sources, by adding together sounds from both sources. In order to do this without creating excessive color or sound, the data coefficients are scaled. In one embodiment, the data is scaled by division by $2^N-1$. Thus, the equation utilized is:

$$Q = \frac{Y}{(2^N - 1)},$$

where N is an integer, Y is an unsigned numerator value representing an original coefficient value of a data, and Q is the result to be obtained. In this equation, a simple method of obtaining the value of Q is used. For 16-bit colors, such as those used in some computer displays, division by 255 is often necessary. Thus, in that instance, the value of N is eight.

Figure 3:
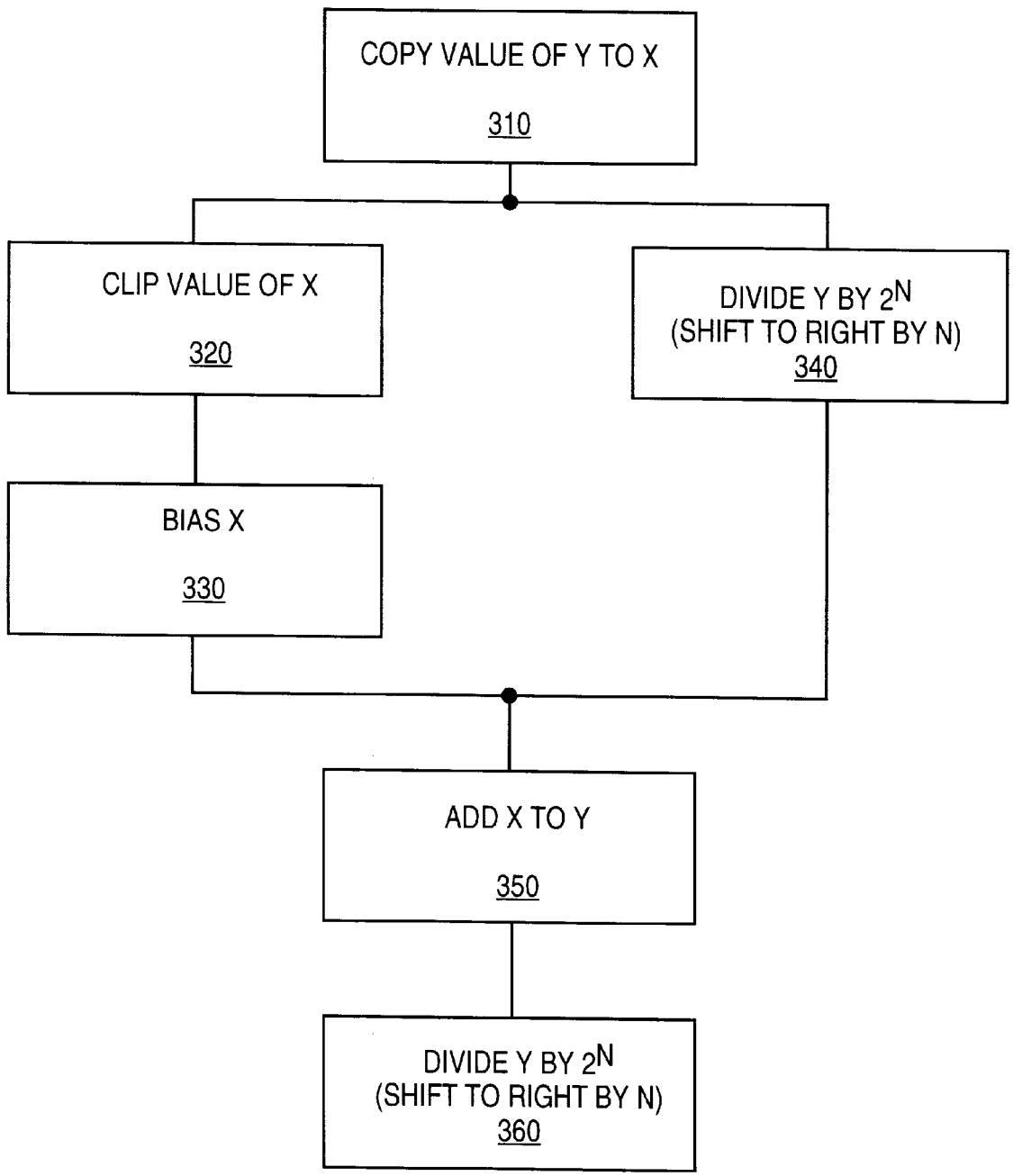
FIG. 3 is a flowchart illustrating the methodology of the present invention.

FIG. 3 is a flowchart illustrating the process of the present invention. The value Y is the numerator, which is to be divided by $2^N-1$. At block 310, the value Y is copied to X. This duplicates the value in Y.

At block 330, a biasing value is added to X. The biasing value is used to scale the value of X, such that the resulting data may be smaller in size.

At block 340, Y is divided by $2^N$. In one embodiment this is accomplished by shifting Y to the right by N.

At block 350, the values of Y and X are added. Thus, the resultant value, Y, is the sum of the biased value of X and the shifted value of Y.

At block 360, this sum is divided by $2^N$. In one embodiment this is accomplished by shifting Y to the right by N. The resultant value of Y is equal to Q, where $$Q = \frac{Y}{(2^N - 1)}.$$

Thus, these five short latency steps, some of which are done in parallel, produce the result normally obtained by a long division process. In this instance, in order to prevent overflow at the addition step of block 350, the value of Y has to be restricted to $2^{2N}-2^N-1$. Otherwise, when Y and X are added, the location in which Y is stored may overflow, producing in an incorrect result. However, clipping, as will be described below, can eliminate this restriction.

Figure 4:
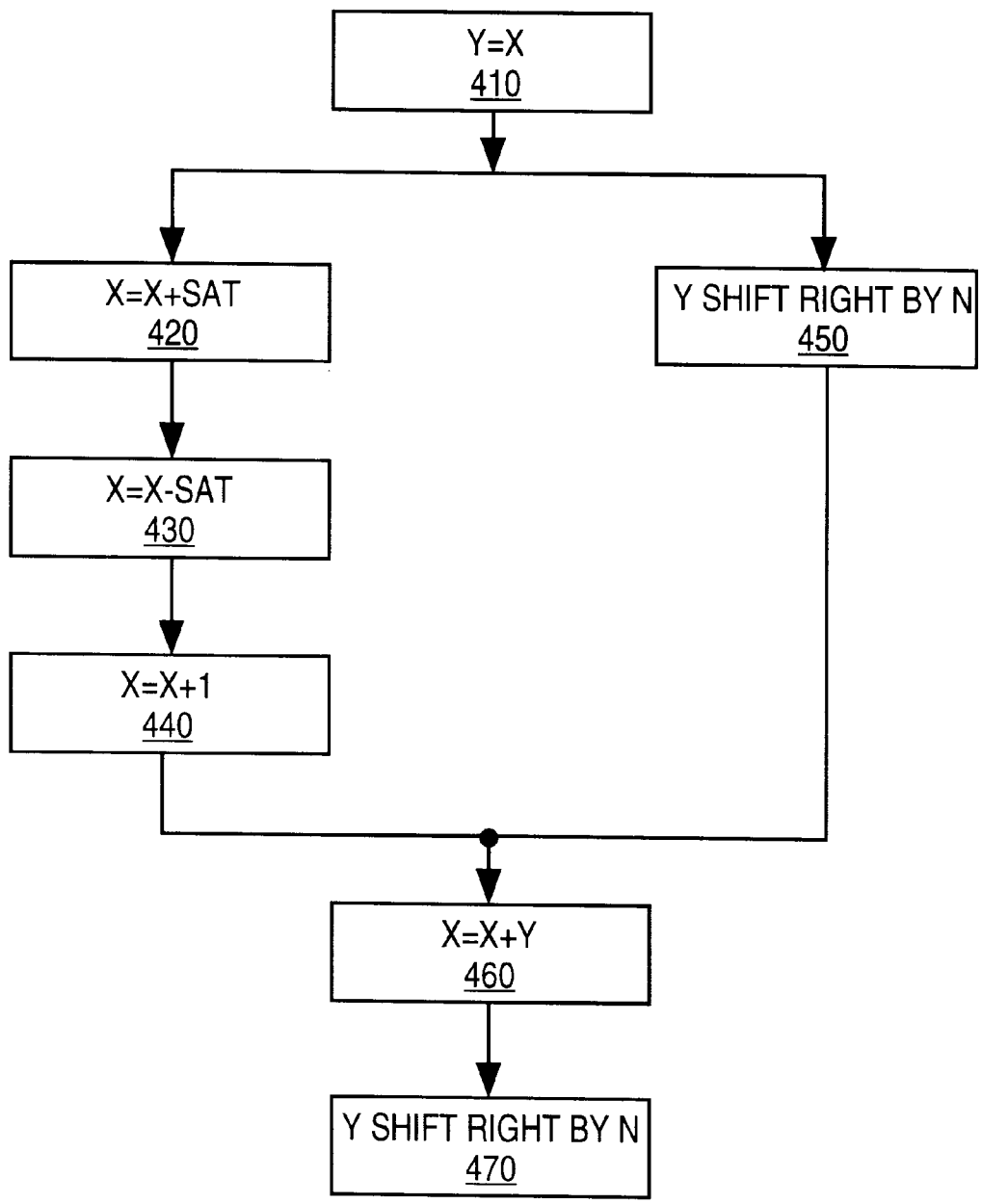
FIG. 4 is a flowchart illustrating the process of dividing a number according to the methodology of the present invention.

FIG. 4 is a flowchart illustrating a more detailed process of the present invention. Y is a numerator which is to be divided by the denominator of $2^N-1$. At block 410, the value of the numerator Y is copied to X. This duplicates the value of Y.

At block 420 and 430 the value of X is clipped. Clipping is a method of reducing the value of X to below a maximum value, which would cause overflow in further processing. Clipping is utilized to prevent an overflow later in the process. In one embodiment, clipping is accomplished by first adding and then subtracting the clipping value.

For example, for a data A, the original value of A is above the maximum value. When the saturation value is added, A overflows, and thus the intermediate value of A is equal to the highest value which may be stored in the register. When the saturation value is then subtracted, the final value of A is equal to the highest value which may be stored in the register, minus the saturation value subtracted. This value of A is equal to the maximum value. For another example, for data B, when the value of B is below the maximum value, the final value of B does not change as a result of the clipping. Thus, the value of X is reduced, if it is above a certain maximum value.

At block 420, a saturation value is added to the value of X. For a 16-bit value, the saturation value is $100_{16}=256$, one plus the maximum value that can be stored eight bits. If X is above a maximum value, in a 16-bit environment, the value of X is now $FFFF_{16}$. Otherwise, the value is the value of X+256.

At block 430, the saturation value is subtracted from the value of X. This either reduces the value of X to the same value it had prior to the adding of the saturation value, if the original value of X was below a maximum. If, however, the value of X was above the maximum, in a 16-bit environment, the value of X as this point is $FFFF_{16}$(65,536)$-100_{16}$(256)$=FEFF_{16}$(65,280).

At block 440, a biasing value of one (1) is added to the value of X. The biasing value is used to scale the value of X, such that the resulting data may be smaller in size. In one embodiment, if X is a sixteen bit data, then using the biasing value, the resultant data is an 8 bit data. In one embodiment this step may be combined with the step at block 420, by adding the saturation value plus the biasing value to X at block 420. However, separating these steps clarifies the process.

At block 450, Y is shifted right by N. This is the equivalent to dividing the value of Y by $2^N$. Note that this may occur in parallel with the processing of blocks 420, 430 and 440. In one embodiment, in a 16-bit environment, the divisor is 256, and the value of N is eight. Thus, the value of Y is shifted to the right by 8. If Y is a 16-bit number, the most significant eight bits are filled by zeroes, and the lower eight bits are filled by the values which were originally in the higher eight bits.

At block 460, the value of X is added to Y. Because the value of X was clipped at blocks 420 and 430, this sum does not overflow.

At block 470, once again, Y is shifted right by N. This result, Y, is the result of the division operation.

Figure 5:
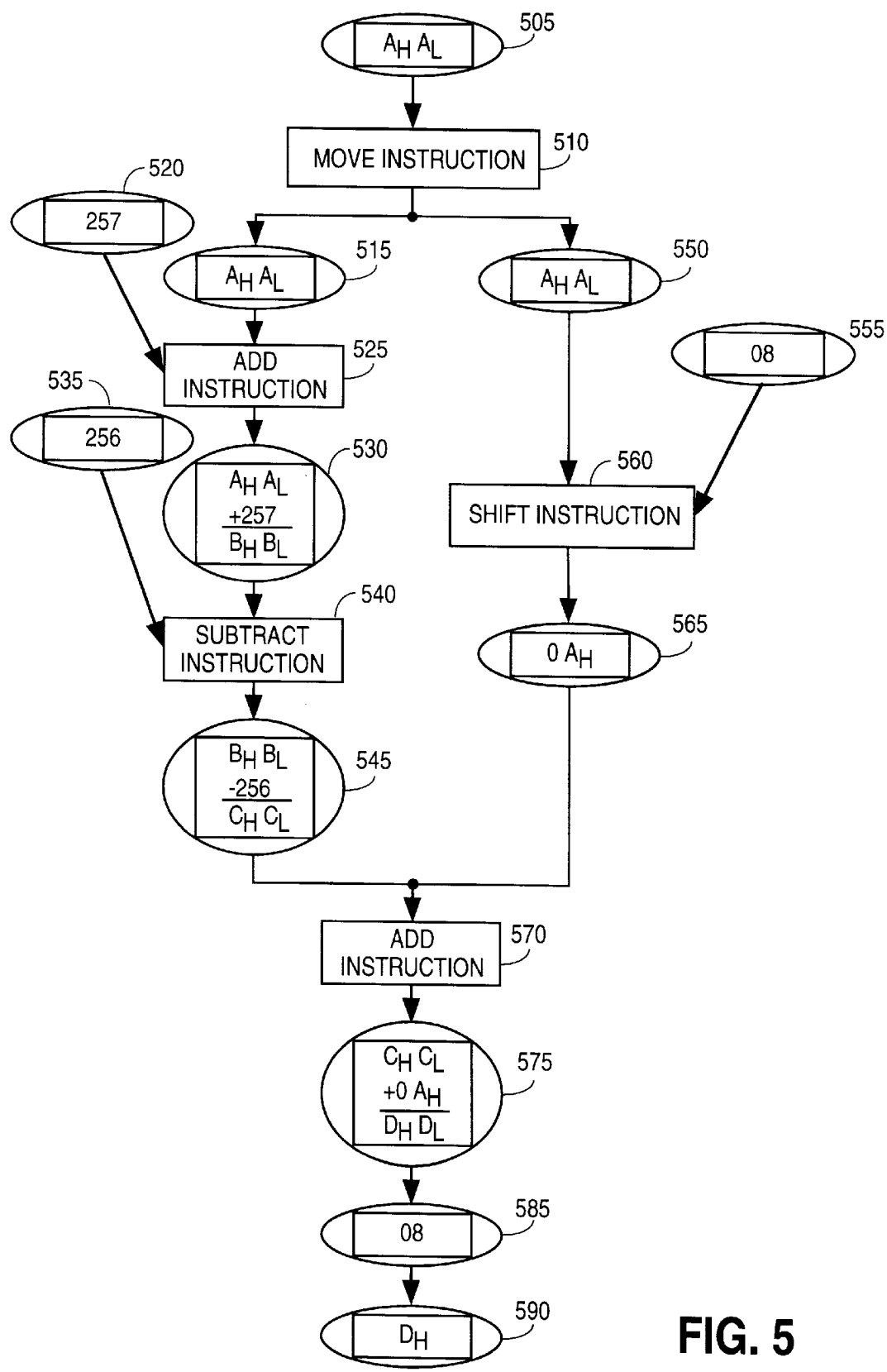
FIG. 5 illustrates a technique for dividing a packed data number according to the methodology of the present invention.

FIG. 5 illustrates technique for performing a division by $2^N-1$ according to one embodiment of the invention. First data item 505 is a 16-bit number, having a high component $A_H$, and a low component $A_L$. Note that FIG. 5 illustrates non-packed data. However, in an alternate embodiment, first data item 505 could be packed data, consisting of $A1_H A1_L A2_H A2_L A3_H A3_L A4_H A4_L$, and the process would be similar to that illustrated in FIG. 5. At block 510, a move instruction copies the data contained in the first data item 505 to another location. This duplicates the first data item 505.

Second data item 515 is identical to the first data item 505. At block 525, an add instruction is executed. Third data item 520 is a number which is added to second data item 515, at block 525. The third data item 520 is a saturation value. In one embodiment, in a 16-bit system, the value of third data item 520 is 256. In one embodiment, the third data item 520 includes the saturation value plus a biasing value. In that embodiment, in a 16-bit system, the value of the third data item 520 is 257. In one embodiment, the saturation value is 256, while the biasing value is one (1).

Fourth data item 530 comprises $B_H B_L$, a 16-bit number having a high and low component. $B_H B_L$ is the sum of the second data item 515, $A_H A_L$, and the third data item 520, 257.

At block 540, a subtract instruction is executed. Fifth data item 535 is subtracted from fourth data item 530. In one embodiment, the fifth data item 535 is identical to the third data item 520, which is the saturation value. In one embodiment, in a 16-bit system, the value of the fifth data item 535 is 256. Sixth data item 545, $C_H C_L$ is the result of the subtraction executed at block 540.

Seventh data item 550 is the copy of the first data item 505, $A_H A_L$ created at block 510. At block 560, a shift instruction is performed on seventh data item 550. The seventh data item 550 is shifted by N, the value of N being the eighth data item 555. In one embodiment, in a 16-bit system, the value of N is eight, thus the seventh data item 550 is shifted by 8. The ninth data item 565 is the result of the shift operation performed in block 560. The shift instruction is a logical right shift operation, in which leading empty bits are filled by zeroes. Thus, the ninth data item 565 is $0A_H$.

At block 570, an add instruction is performed on the eight data item 565, $0A_H$, and the sixth data item 545, $C_H C_L$. The tenth data item 575, $D_H D_L$, is the result of the add instruction. In one embodiment, as a result of the clipping performed by the add instruction at block 525 and the subtract instruction at block 540, the tenth data item 575 does not overflow.

At block 580, a shift instruction is performed on the tenth data item 575, $D_H D_L$. The tenth data item 575 is shifted by N, the value of N being the eleventh data item 585. The eleventh data item 585 is identical in value to the eighth data item 555. In one embodiment, in a 16-bit system, the value of N is eight, thus the tenth data is logically shifted to the right by eight.

The twelfth data item 590 is the result of the shift operation, and the result of the division. The twelfth data item 590, $D_H$, is equal to Q. In one embodiment, the twelfth data item is an 8 bit data item.

Figure 6A:
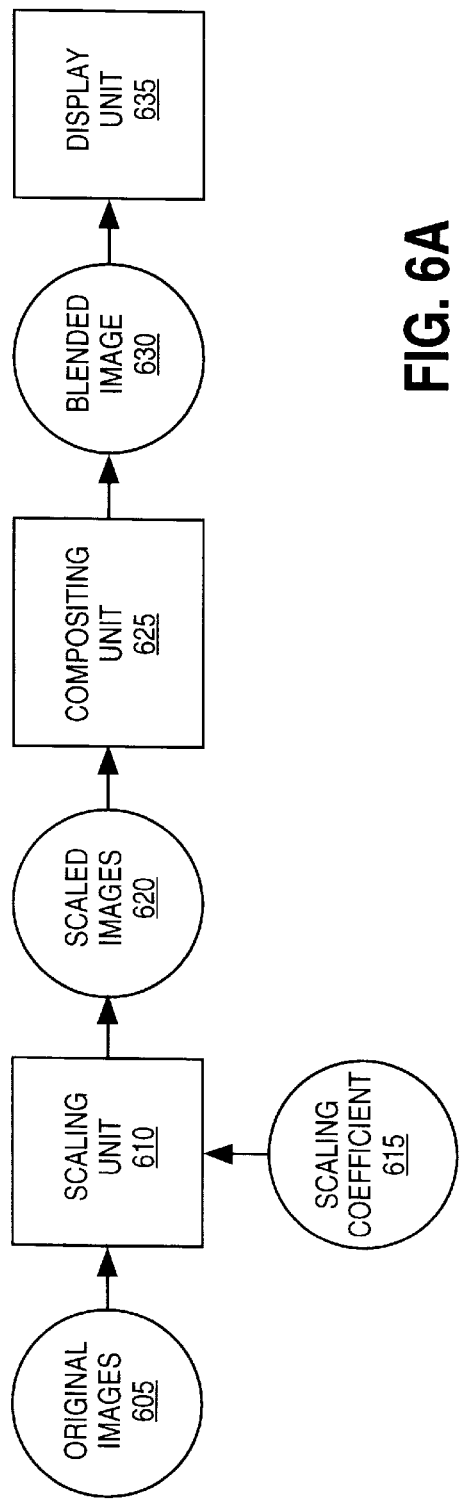
FIG. 6A illustrates a general block diagram illustrating the use of a compositing unit for compositing a plurality of images according to one embodiment of the present invention.

FIG. 6A illustrates a general block diagram illustrating the use of a compositing unit for compositing a plurality of images according to one embodiment of the present invention. The original images 605 may be generated by the computer system 600, or may be received by the computer system. In one embodiment, one or more of the original images 605 may be received from TV broadcast signal receiver 131, a network 130, a fax/modem 132, or a storage device 110. Alternatively, the original images 605 may be received from other sources.

The original images 605 are input to the scaling unit 610. The scaling unit is utilized to scale the original images 605 in order to allow the original images 605 to be combined. A scaling coefficient 615 is also an input to the scaling unit 610. The scaling unit 610 scales the original images 605 by a scaling coefficient 615. In one embodiment, the scaling unit 610 is utilized to divide the digital representation of the image by a divisor. In one embodiment, the scaling coefficient is the divisor. In one embodiment, this is accomplished utilizing the process described above with respect to FIG. 3.

The output of the scaling unit 610 are scaled images 620. These scaled images 620 are the digital representations of a plurality of images which are to be combined into a single image. The scaled images 620 are input into a compositing unit 625. The compositing unit combines the scaled images 620 into a blended image 630. In one embodiment, the compositing unit adds the digital coefficient representing each point on the image to obtain a blended image 630. The blended image 630 is output via a display unit 635. In one embodiment, the display unit 635 may be the CRT screen of a computer system. Alternatively, any other method of displaying images may be utilized.

Figure 6B:
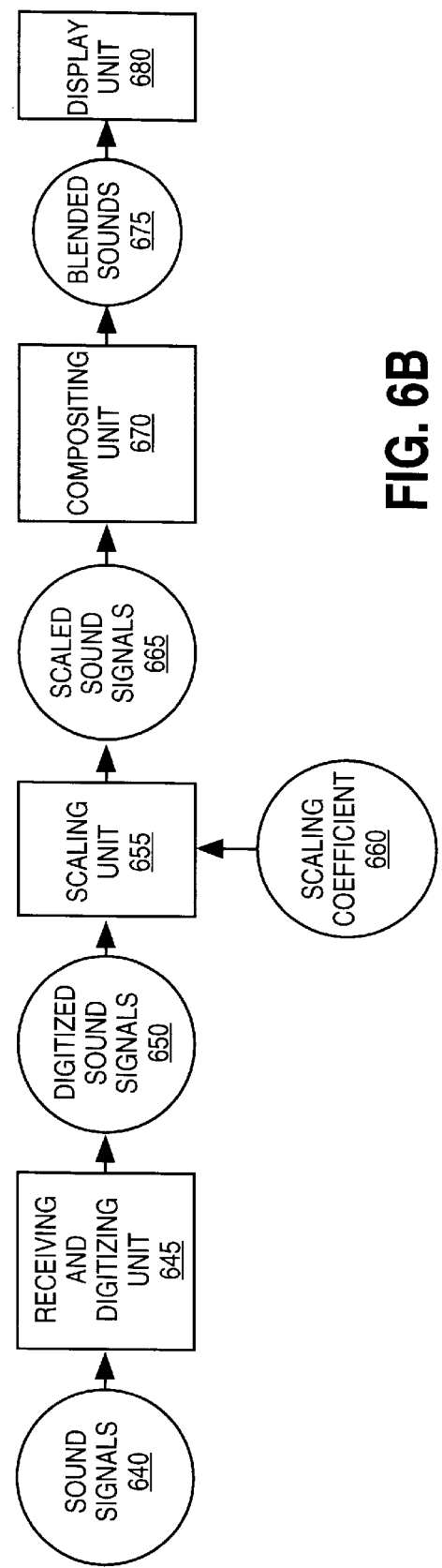
FIG. 6B illustrates a general block diagram illustrating the use of a compositing unit for compositing a plurality of sounds according to one embodiment of the present invention.

FIG. 6B illustrates a general block diagram illustrating the use of a compositing unit for compositing a plurality of sounds according to one embodiment of the present invention. Sound signals 640 may be generated within the computer system 685. In this instance, the sound signals 640 are illustrated as being generated outside the computer system 685. In one embodiment, the sound signals 640 are received or generated by a sound unit 134, or a TV broadcast signal receiver 131.

The sound signals 640 are an input to a receiving and digitizing unit 645. If the sound signals 640 are generated outside of the computer system 685, the sound signals 640 may be digitized before being processed. Thus, in one embodiment, the receiving and digitizing unit 645 digitizes the sound signals 640.

The output of the receiving and digitizing unit 645 are digitized sound signals 650. The digitized sound signals 650 are input to the scaling unit 655. The scaling unit is utilized to scale the original sounds 640 in order to allow the digitized sound signals 650 to be combined. A scaling coefficient 660 is also an input to the scaling unit 655. The scaling unit 655 scales the digitized sound signals 650 by a scaling coefficient 660. In one embodiment, the scaling unit 655 is utilized to divide the digital representation of the sound by a divisor. In one embodiment, the scaling coefficient is the divisor. In one embodiment, this is accomplished utilizing the process described above with respect to FIG. 3.

The output of the scaling unit 655 are scaled sound signals 665. These scaled sound signals 665 are the digital representations of a plurality of sounds which are to be combined into a single sound. The scaled sound signals 665 are input into a compositing unit 670. The compositing unit combines the scaled sound signals 665 into a blended sound 675. In one embodiment, the compositing unit adds the digital coefficient representing each sound to obtain a blended sound 675. The blended sound 675 is output via a display unit 680. In one embodiment, the display unit 680 may be the speakers of computer system. Alternatively, any other method of playing sounds may be utilized.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The present invention should not be construed as limited by such embodiments and examples, but rather construed according to the following claims.

What is claimed is:

1. A method for compositing images, sounds, or other data, wherein said compositing requires a division of a first number by a second number, the second number being the value of two to the Nth power minus one, said division comprising the computer implemented steps of:

copying the first number, the copying producing a third number;

biasing the third number;

shifting the first number by N;

adding the third number to the first number; and shifting the first number by N.

2. The method of claim 1, wherein said first number is a packed data number.

3. The method of claim 1 wherein said step of biasing comprises a step of adding a one to said third number.

4. The method of claim 1, further comprising clipping said third number before the biasing step.

5. The method of claim 4, wherein said step of clipping comprises:

adding a saturation value to said third number, the adding producing an intermediate number; and subtracting said saturation value from said intermediate number.

6. The method of claim 1, wherein said step of biasing comprises;

adding a saturation value plus one to said third number; and subtracting said saturation value from said third number.

7. The method of claim 1, wherein said first number is a 16-bit value.

8. The method of claim 7, wherein said first number is a X bit number and said second number is a X/2 bit number, and a second instance of shifting being a result of the division, and the result is a X/2 bit number.

9. The method of claim 8, wherein said first number is a sixteen bit number and said second number is an eight bit number, and the result is an eight bit number.

10. The method of claim 1, wherein said value of N is eight.

11. The method of claim 1, wherein said first number is limited to a value of two to twice the value of N, minus two to the value of N, minus one.

12. A method for compositing images, sounds or other data, wherein said compositing requires a division of a sixteen bit first number by an eight bit second number, the eight bit second number being 255, said division comprising the computer implemented steps of:

copying the first number, the copying producing a third number;

shifting the first number by eight;

adding 257 to the third number;

subtracting 256 from the third number;

adding the third number to the first number;

shifting the first number by eight; and wherein a result is an eight bit number.

13. A machine readable medium having stored thereon data representing sequences of instructions, which when executed by a computer system, cause said computer system to perform the step of compositing images, sounds or other data, wherein said compositing requires a division of a first number by a second number, the second number being the value of two to the Nth power minus one, said division comprising the computer implemented steps of:

copying the first step, the copying producing a third number;

biasing the third number;

shifting the first number by N;

adding the third number to the first number; and shifting the first number by N.

14. The machine readable medium of claim 13, wherein said first number is a packed data number.

15. A machine readable medium of claim 13 wherein said step of biasing comprises the step of adding a one to said third number.

16. A machine readable medium of claim 13, further comprising clipping said third number before the biasing step.

17. The machine readable medium of claim 16, wherein said step of clipping comprises:

adding a saturation value to said third number, the adding producing an intermediate number; and subtracting said saturation value from said intermediate number.

18. The machine readable medium of claim 13, wherein said step of biasing comprises:

adding a saturation value plus one to said third number; and subtracting said saturation value from said intermediate number.

19. The machine readable medium of claim 13, wherein said first number is a 16-bit value.

20. The machine readable medium of claim 13, wherein said value of N is eight.

21. The machine readable medium of claim 13, wherein said first number is limited to a value of two to twice the value of N, minus two to the value of N, minus one.

22. The method of claim 13, wherein said first number is a X bit number and said second number is a X/2 bit number, and a second instance of shifting being a result of the division, and the result is a X/2 bit number.

23. The method of claim 22, wherein said first number is a sixteen bit number and said second number is an eight bit number, and the result is an eight bit number.

24. A machine readable medium having stored thereon data representing sequences of instructions, which when executed by a computer system, cause said computer system to perform the step of compositing images, sounds or other data, wherein said compositing requires a division of a first number by 255, said division comprising the computer implemented steps of:

copying the first step, the copying producing a third number;

shifting the first number by eight;

adding 257 to the third number;

subtracting 256 from the third number;

adding the third number to the first number; and shifting the first number by eight.

* * * * *